United States Patent [19]

Linde

[11] Patent Number: 5,745,670
[45] Date of Patent: Apr. 28, 1998

[54] FAULT TOLERANT POWER SUPPLY SYSTEM

[75] Inventor: Yoseph L. Linde, Needham, Mass.

[73] Assignee: LANart Corporation, Needham, Mass.

[21] Appl. No.: 661,368

[22] Filed: Jun. 11, 1996

[51] Int. Cl.$^6$ .................... G06F 11/00; H03M 13/00
[52] U.S. Cl. .................... 395/182.2; 307/64; 307/65; 395/750; 395/182.12
[58] Field of Search .................... 395/182.2, 182.12, 395/750; 307/43, 44, 45, 46, 52, 53, 60, 62, 64, 65, 66, 69; 323/338

[56] References Cited

U.S. PATENT DOCUMENTS

| 4,417,194 | 11/1983 | Curtiss et al. . | |
|---|---|---|---|
| 4,539,487 | 9/1985 | Ishii | 307/44 |
| 4,607,330 | 8/1986 | McMurray et al. | 395/182.12 |
| 4,659,942 | 4/1987 | Volp . | |
| 4,788,449 | 11/1988 | Katz . | |
| 5,073,848 | 12/1991 | Steigerwald et al. | 361/103 |
| 5,138,142 | 8/1992 | Sanemitsu . | |
| 5,214,311 | 5/1993 | Kageyama et al. . | |
| 5,266,838 | 11/1993 | Gerner | 307/19 |
| 5,293,632 | 3/1994 | Novakovich et al. | 395/750 |
| 5,381,554 | 1/1995 | Langer et al. | 395/750 |
| 5,557,738 | 9/1996 | Townsley et al. | 395/182.12 |

Primary Examiner—Robert W. Beausoliel, Jr.
Assistant Examiner—P. Vales
Attorney, Agent, or Firm—Lappin & Kusmer LLP

[57] ABSTRACT

A fault tolerant power supply system includes a plurality of devices coupled to a common power distribution bus. The devices are arranged and connected in a hierarchical order. The system provides that the devices of higher rank or position in the hierarchy to obtain priority in drawing power from the bus. Each device is coupled to the next adjacent device via a control status line that indicates whether there has been a failure of the power supply of any device higher up in the hierarchy. In the event that the local power supply of a device fails, it can be selectively connected to the power distribution bus to draw power, only if the control status line indicates that there have no failures in the devices having a higher hierarchical rank. Once connected to power distribution bus, if a higher ranking device should experience a power supply failure, the device will be disconnected from the power distribution bus and the higher ranking device connected to the power distribution bus.

16 Claims, 3 Drawing Sheets 5,745,670

FAULT TOLERANT POWER SUPPLY SYSTEM

BACKGROUND OF THE INVENTION

This invention relates to fault tolerant power supply systems and, more particularly, to a hierarchical fault tolerant power supply system which provides power to devices connected to the system and avoids overloading the system in the event of multiple failures.

Most electronic equipment requires a power supply which converts AC power to DC power. This power supply tends to be the least reliable component of the electronic equipment. In environments where reliability and availability are important, it is necessary to provide a scheme whereby the equipment can automatically be provided with an alternative source of power in the event that the local power supply fails.

One method of providing fault tolerance is to provide a redundant or backup power supply which stands idle until a power supply failure is detected triggering the backup power supply to take over for the failed unit. The obvious drawback of this scheme is that it is inefficient, the backup power supply adds to the overall cost, size and weight of the system.

An alternative method of providing fault tolerance is to share power with other pieces of electronic equipment via a common power bus. In this configuration, the power supplies of many pieces of electronic equipment are connected to the power bus (via isolating diodes) and each piece of electronic equipment draws power from the common power bus. This approach has many disadvantages. Specifically, there is no mechanism to control the amount of power provided by each power supply to the bus and no mechanism to control the amount of power drawn by each piece of equipment. Since the individual power supplies are in a "wired-OR" configuration, the supply that provides the highest voltage is likely to be pushed to maximum capacity while the lowest voltage supply may have no load at all. Since the probability of failure of a power supply increases with load and temperature, the supply under the highest load (which also causes it to run hot) is more likely to fail sooner, reducing the reliability of the system and decreasing the mean time between failures. If multiple power supplies fail, it is likely that the remaining power supplies will go into overload condition because they are trying to power too many devices. Furthermore, because all the power is derived from the power bus, a short to ground at one load can bring down the entire power bus if overcurrent protection, such as fuses or circuit breakers, is not provided.

In addition, power supplies providing relatively low voltage power, such as the 3 and 5 volt power supplies used to power microprocessor based systems, can lose a substantial portion (up to 20%) of the supply voltage to the forward voltage drop of the isolating diodes. Because this voltage drop can vary with load current and temperature, the supplied voltage may vary beyond acceptable tolerance levels.

Accordingly, it is an object of this invention to provide an improved fault tolerant power supply system.

It is another object of this invention to provide an improved fault tolerant power supply system wherein when there are no power supply failures, each power supply services its own device and there is no power sharing thus no power supply is utilized to maximum capacity and the mean time between failures is improved.

It is yet another object of this invention to provide an improved fault tolerant power supply system which includes a hierarchical configuration that prevents overloading the system in the event of multiple power supply failures.

SUMMARY OF THE INVENTION

The present invention relates to a fault tolerant power supply system which permits a plurality of devices to share power in the event that the power supply of one of the devices should fail. Each individual device includes a local power supply to provide power to the device. The power supply is also coupled to a power distribution bus in order to permit power sharing in the event of a power supply failure. Each individual device also includes a switch for selectively connecting the device to the power distribution bus in order to draw power from the bus in the event that its local power supply fails. Each individual device can sense the failure of its local power supply. A control element is provided for controlling the switch to provide power to the local device in the event of failure of the local power supply. The control element is powered by the power distribution bus to ensure that it is operational, independent of the status of the local power supply.

The control element of each device controls the operation of the switch as a function of the status the local power supply of the device and the status of the other power supplies in the system. The control element will not permit the switch to connect the device to power distribution bus in the event of failure of the local power supply if another power supply of the system has failed. This prevents multiple power supply failures from causing the remaining power supplies to become overload causing the entire system to fail.

The devices in the system can be arranged in a hierarchy such that in the event of multiple power supply failures, devices of higher rank or importance to the system will be given priority in their ability to draw power from the power distribution bus over lower ranking devices in the system.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE PREFERRED EMBODIMENTS

The present invention is directed to a fault tolerant power supply system wherein at least one device has the ability to draw power from its local power supply as well as the ability to share power via a common power distribution bus. In the event that its local power supply fails, the device is permitted to connect to the power distribution bus to draw power. In one preferred embodiment, each device in the system is coupled to the next adjacent device according to a system hierarchy. In the event of multiple power supply failures, the device having the higher position in the hierarchy will be permitted to connect to the power distribution bus in preference over the device having the lower position.

Figure 1:
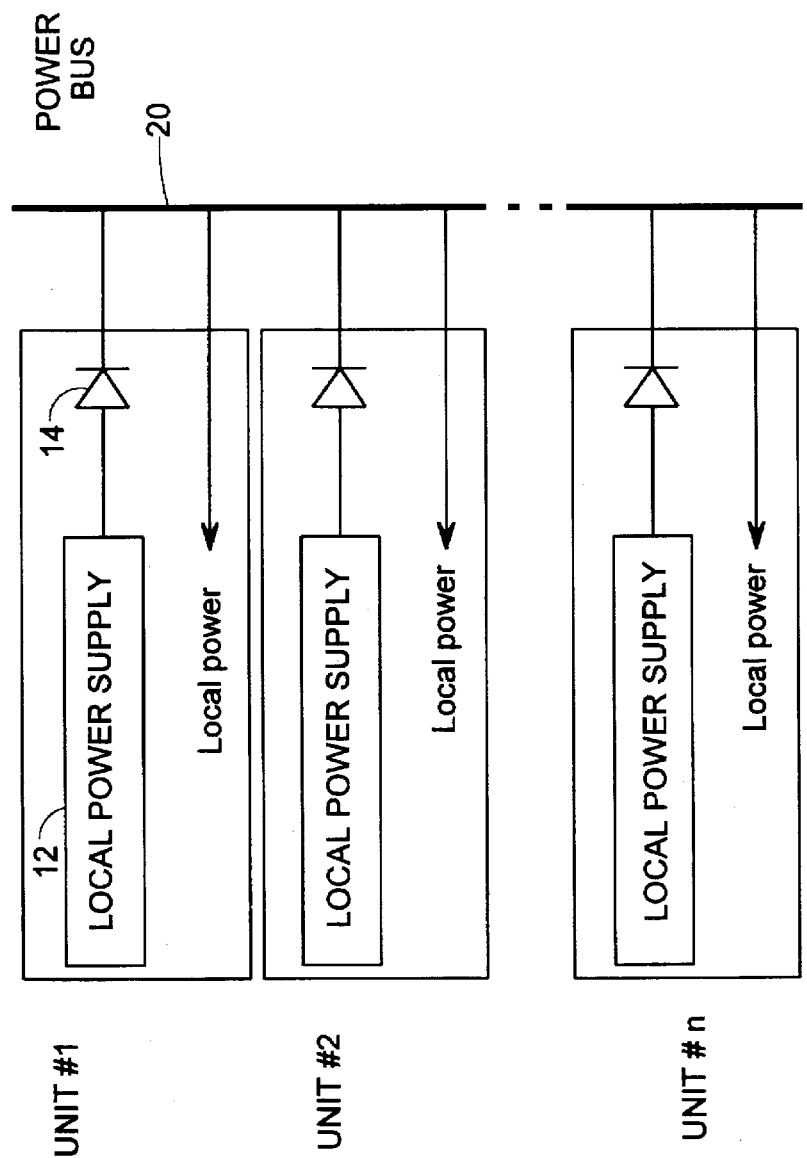
FIG. 1 is a diagrammatic view of one prior art system.

FIG. 1 shows a prior art fault tolerant power supply system. The system includes a plurality of devices (unit #1, unit #2 through unit #n) coupled to a common power distribution bus 20. Each device 10 includes a local power supply 12 coupled to the power distribution bus 20 through an isolating diode 14. As shown, each device 10 draws power from the power distribution bus directly and no means is provided to permit the device to draw power from the local power supply directly.

This prior art system suffers from several disadvantages. All the devices connected to the power distribution bus 20 are in a "wired-OR" configuration, thus the power supply having the highest voltage is powering the majority of the load. Furthermore, in the event that the power supplies of several units fail, the remaining power supplies are likely to be overloaded and fail as well.

Figure 2:
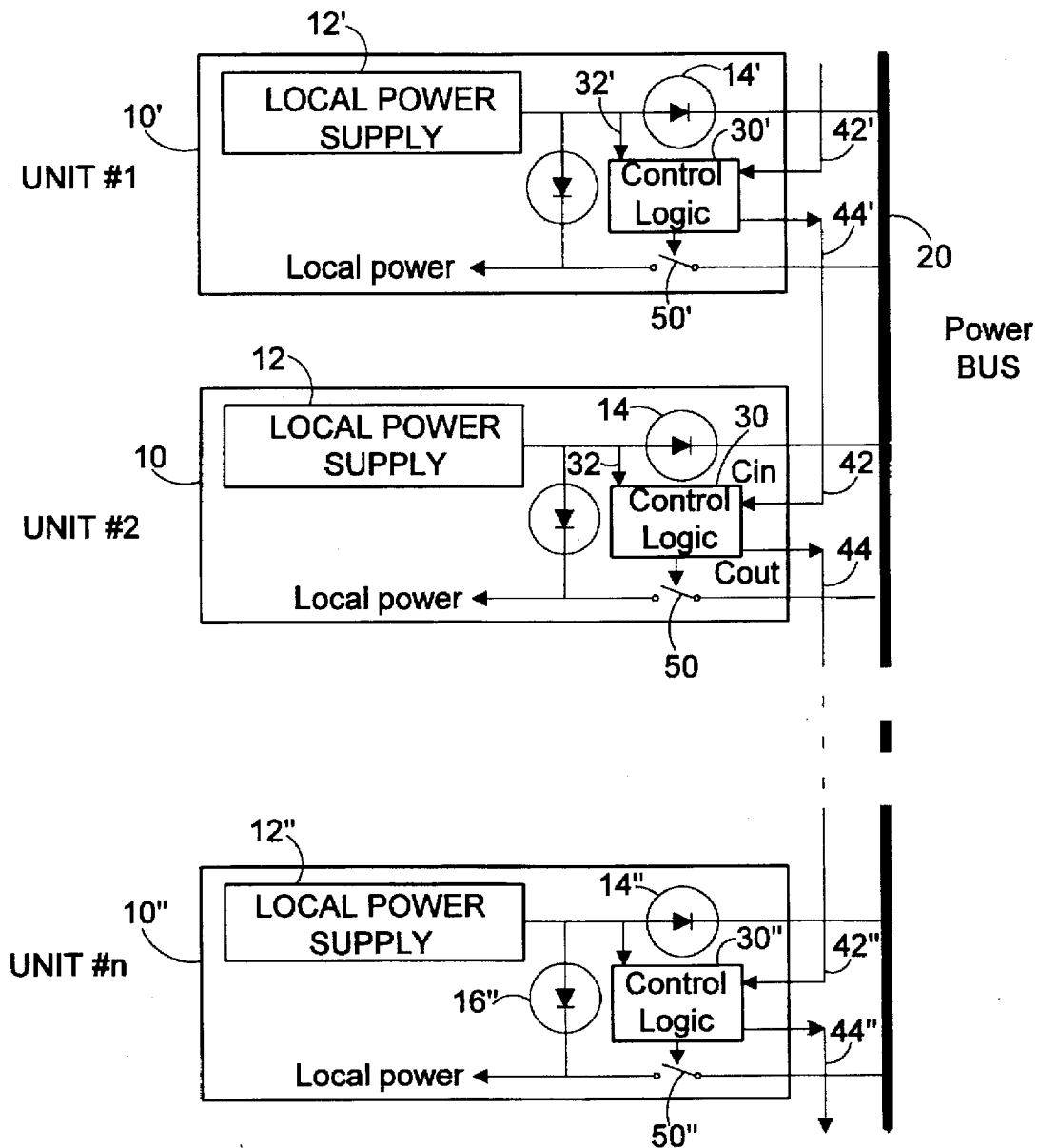
FIG. 2 is a diagrammatic view of a system in accordance with the present invention.

FIG. 2 shows a fault tolerant power supply system in accordance with the present invention. The system includes a plurality of devices (unit #1, unit #2 through unit #n) coupled to a common power distribution bus 20. Each device 10, 10', 10" includes a local power supply 12, 12', 12" coupled to the power distribution bus 20 through an isolating diode 14, 14', 14" and each device 10, 10', 10" draws power from its local power supply 12, 12', 12" through isolating diode 16, 16', 16". Each device 10, 10', 10" further includes control logic 30, 30', 30" and a switch 50, 50', 50" to permit the device 10, 10', 10" to draw power from the power distribution bus 20 in the event that the local power supply 12, 12', 12" fails.

The control logic 30 in each device also includes a control status input 42 and provides a control status output 44. Each of the devices in the system is organized in a hierarchy whereby the control status output 44' is connected the control status input 42 of the next adjacent device. Them is no connection to the control status input 42' of the first or highest device in the hierarchy (unit #1) and the control status output 44" of the last or lowest device in the hierarchy (unit #n) is unconnected.

The control logic 30 utilizes the sensed status of the power supply 12 (i.e. power supply failure) and the control status input 42 which is coupled to the control status output 44' from the next higher adjacent device in the hierarchy to determine whether it can enable the switch 50 to couple the device 10 to the power distribution bus 20. The control logic 30 will enable the switch 50 to couple the device 10 to the power distribution bus 20 in the event that its local power supply 12 fails if the control status output 44' from the next higher adjacent device 10 in the hierarchy indicates that there has not been a failure in any other power supply located above it in the hierarchy. The control logic 30 will not enable the switch 50 to couple the device 10 to the power distribution bus 20 in the event that its local power supply 12 fails if the control status output 44' from the next higher adjacent device 10 in the hierarchy indicates that any other power supply located above it in the hierarchy has failed.

The control status output 44 of each device 10 is coupled to the control status input 42 of the next adjacent device such that each of the devices in the system are daisy-chained together forming a hierarchy. For example: the control status output 44' of the first or highest device 10' in the hierarchy is connected to the control status input 42 of the next adjacent device 10 and the control status output 44 of device 10 is connected to the control status input 42" of the next adjacent device 10". The control status output 44 of each local control logic 30 is a function of the state of the local power supply 12 and the state of the power supplies (12') of the devices coupled to the device 10. The control status output 44 wild indicate a power supply failure if either the local power supply 12 failed or the control status output 44' coupled to the control status input 42 indicates a failure. Thus the failure of a power supply of a given device 10 will be indicated to all the devices below it in the hierarchy.

Figure 3:
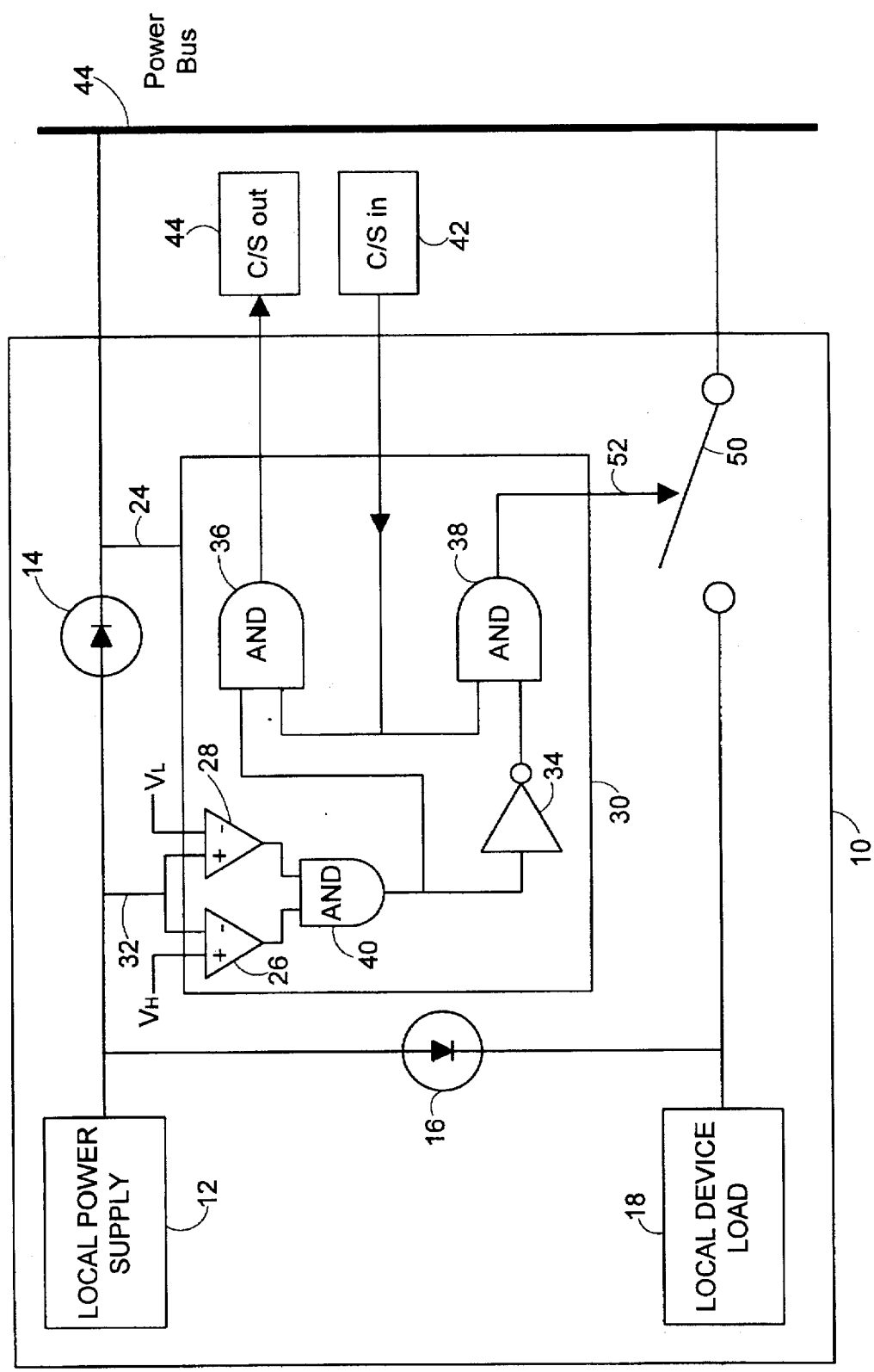
FIG. 3 is a diagrammatic view of a device in accordance with the present invention.

FIG. 3 shows a device 10 for use in a fault tolerant power supply system in accordance with the present invention. In this embodiment, the control logic 30 includes a power supply status input 32, a control status input 42, a control status output 44 and switch control output 52. The control logic 30 uses the power supply status input 32 and the control status input 42 to control the switch 50 via the switch control output 52. The control logic 30 also uses the power supply status input 32 and the control status input 42 to determine the control status output 44.

As shown in FIG. 3, the operation control logic 30 is represented by a group of logic symbols or gates and the signals are represented as binary logic (i.e. 1 or 0). The conventions used in the figure are that a power supply failure condition is indicated by a control status output 44 of 0 and a power supply operational (no failure) condition is indicated as 1 and the failure condition of the local power supply is also indicated as 0 and the no failure condition is indicated as 1. As one of ordinary skill in the art will appreciate, these conventions permit direct replacement of the logic symbols 34, 36, 38 and 40 with digital electronic logic components such as TTL devices. In the case where the device is a digital electronic device requiring 5 volts DC power, this permits the power supply status input 32 to tap off the power supply 12 output using a current limiting resistor (not shown) in order to sense the status of the local power supply 12.

In one embodiment, power supply status input 32 is coupled to a pair of comparators, an over voltage comparator 26 and an under voltage comparator 28, in order to compare the local power supply voltage to a high limit $V_H$ and a low limit $V_L$. The outputs of the comparators 26 and 28 are coupled to an AND logic gate 40. The output of AND logic gate 40 represent the status of the local power supply. The output of AND logic gate 40 is high (logical 1) when the power supply is within the limits $V_L$ and $V_H$ and the output is low (logical 0) when the local supply voltage is outside the acceptable range defined by $V_H$ and $_L$.

The switch 50 is controlled as a function of the power supply status from AND logic gate 40 and the control status input 42. The only instance when the switch 50 is permitted to connect the device 10 to the power distribution bus 20 is when the control status input 42 receives a signal from the control status output 44 of the higher adjacent device indicating that there are no failures higher up in the hierarchy (i.e. by logical 1) and the local power supply 12 has failed and the power supply status indicated at the output of AND logic gate 40 indicates a failure (i.e. by logical 0). To obtain the correct logical switch control output 52 to the switch 50, power supply status from AND logic gate 40 is inverted by inverter 34 and the result is logically ANDed, by AND logic gate 38, with the control status input 42. Thus a logical 1 at the switch control output 52 indicates that the switch 50 can be closed to permit the device 10 to draw power from the power distribution bus 20.

The control status output 44 is also a function of the power supply status from the output of AND logic gate 40 and the control status input 42. The control status output 44 indicates a failure if the power supply status from AND logic gate 40 indicates that the local power supply 10 failed (i.e. by logical 0) or if the control status input 42 indicates that there was a failure by a device higher in the system hierarchy (i.e. by logical 0). The power supply status from AND logic gate 40 is ANDed, by AND logic gate 36, with control status input 42, thus the control status output will only indicate no failure (logical 1) if both the inputs to AND logic gate 36 are high (logical 1) indicating no failure of local supply 12 and no failure of the local supplies of any of the devices located higher up in the hierarchy.

In another embodiment, the power supply status signal 32 can be provided as a supplementary signal directly from the power supply indicating the status of the local power supply 12. Alternatively, a separate device can be used to monitor the status of the local power supply 10 and provide an output signal to the power supply status input 32 indicating the status of the local power supply 10. In the preferred embodiment, the control logic 30, at power input 24, draws power directly from the power distribution bus 20. This provides that the control logic 30 will be able to function independent of the operational condition of the local power supply 10.

The switch 50 can be any element capable of connecting the local device load 18 to the power distribution bus 20, such as a power transistor or a relay. The control logic 30 can be implemented as discrete logic components or as part of a programmable array. In the preferred embodiment, the control logic 30 is implemented as using standard CMOS or TTL analog and logic devices, the switch 50 is a low impedance MOSFET and the diodes are low dropout Schotkey diodes.

In an alternative embodiment, the control status input 42 and control status output 44 can be omitted or simply not used (the control status input 42 would be tied high or otherwise configured to indicate no failure). The control logic can be configured to simply connect the device to the power distribution bus in the event that the local power supply fails. While this removes the hierarchy of the system, it does provide that multiple devices can draw power simultaneously from the power distribution bus in the event of multiple power supply failures.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A fault tolerant power supply system for supplying power to a plurality of devices, at least one device of said system comprising:
    a local power supply means for supplying power to a local device of said plurality of devices;
    means for coupling said local power supply means to a power distribution bus for distribution of power to other devices coupled to said power distribution bus;
    switch means for selectively coupling said local device to said power distribution bus to control the flow of power to said local device from said power distribution bus;
    sensing means for sensing a condition of said local power supply means;
    control logic means for controlling said switch means in response to said sensed condition of said local power supply means and a signal from one of said other devices.

2. A fault tolerant power supply system according to claim 1 wherein said signal from one of said other devices indicates a first condition if the power supply means in said other device is operational and a second condition if the power supply has failed.

3. A fault tolerant power supply system according to claim 2 wherein said control logic permits said switch to close to enable the flow of power to said local device from said power distribution bus, if said local power supply means fails and said signal from said one of said other devices indicates a first condition.

4. A fault tolerant power supply system according to claim 2 wherein said control logic prevents said switch from closing if said signal from said one of said other devices indicates a negative condition.

5. A fault tolerant power supply system according to claim 1 wherein said means for coupling said local power supply means to a power distribution bus includes means for preventing the flow of current into said local power supply means.

6. A fault tolerant power supply system according to claim 1 wherein said control logic means draws power from said power distribution bus to permit said control logic means to function independent of the condition of said local power supply means.

7. A fault tolerant power supply system for supplying power to a plurality of devices, said system comprising:
    a first device of said plurality of devices including a first local power supply means for supplying power to said first device, means for coupling said first power supply means to a power distribution bus for distribution of power to other devices coupled to said power distribution bus, first switch means for selectively coupling said first device to said power distribution bus to control the flow of power to said first device from said power distribution bus and first control logic means for controlling said first switch means in response to a sensed condition of said first local power supply means and a signal from one of said other devices;
    a second device of said plurality of devices including a second local power supply means for supplying power to said second device, means for coupling said second local power supply means to said power distribution bus for distribution of power to other devices coupled to said power distribution bus, second switch means for selectively coupling said second device to said power distribution bus to control the flow of power to said second device from said power distribution bus and second control logic means for controlling said second switch means in response to a sensed condition of said second local power supply means and a signal from said first device;
    said second control logic means including means for permitting said second switch means to close, if said sensed condition of said second local power supply indicates that said second local power supply means has failed and said signal from said first device indicates that said first power supply means of said first device has not failed and that all power supply means of devices coupled to said first device have not failed and means for preventing said second switch means from closing if either said second local power supply means has not failed or said signal from said first device indicates that said first power supply means has failed or that a power supply means of a device coupled to said first device has failed.

8. A fault tolerant power supply system according to claim 7 wherein said means for coupling said first local power supply means to said power distribution bus includes means for preventing the flow of current into said first local power supply means.

9. A fault tolerant power supply system according to claim 7 wherein said means for coupling said second local power supply means to said power distribution bus includes means for preventing the flow of current into said second local power supply means.

10. A fault tolerant power supply system according to claim 7 wherein said first control logic means draws power from said power distribution bus to permit said first control logic means to function independent of the condition of said first local power supply means.

11. A fault tolerant power supply system according to claim 7 wherein said second control logic means draws power from said power distribution bus to permit said second control logic means to function independent of the condition of said second local power supply means.

12. A device for use in a fault tolerant power supply system, said device comprising:

a local power supply means and means for supplying power to said device;

means for coupling said local power supply means to a power distribution bus for distribution of power to other devices coupled to said power distribution bus;

switch means for selectively coupling said device to said power distribution bus to control the flow of power to said local device from said power distribution bus;

sensing means for sensing a condition of said local power supply means and for producing a first signal representative of said sensed condition of said local power supply means;

control logic means for controlling said switch means in response to said first signal representative of the sensed condition of said local power supply means and a second signal from one of said other devices indicating a sensed condition of a power supply means of said one of said other devices or a sensed condition of a power supply means of a device coupled to said one device.

13. A device according to claim 12 wherein said control logic means includes means for closing said switch means to permit the flow of power to said local device from said power distribution bus if said first signal indicates a failure condition of said local power supply means and said second signal does not indicate a failure condition of any other power supply means.

14. A device according to claim 12 wherein said control logic means includes means for opening said switch means to prevent the flow of power to said local device from the power distribution bus if said second signal indicates a failure condition of any other power supply means.

15. A device according to claim 12 wherein said means for coupling said local power supply to a power distribution bus includes means for preventing the flow of current into said local power supply means.

16. A device according to claim 12 wherein said control logic means draws power from said power distribution bus to permit said control logic means to function independent of the condition of said local power supply means.

* * * * *